United States Patent [19]

Duda et al.

[11] 4,154,258

[45] May 15, 1979

[54] APPARATUS FOR INTRODUCING INGREDIENTS, ESPECIALLY PLANT TREATING SUBSTANCES, INTO A STREAM OF WATER

[76] Inventors: Hubertus Duda, Weinweg 43; Fritz M. Fend, Thurmoyerstr. 11, both of Regensburg, Fed. Rep. of Germany, D-8400

[21] Appl. No.: 856,232

[22] Filed: Dec. 1, 1977

Related U.S. Application Data

[63] Continuation-in-part of Ser. No. 693,464, Jun. 7, 1976, abandoned.

[30] Foreign Application Priority Data

Jun. 10, 1975 [DE] Fed. Rep. of Germany ....... 2525794

[51] Int. Cl.² ............................................. A01C 23/00
[52] U.S. Cl. ..................................... 137/268; 422/270; 239/310
[58] Field of Search .......................... 137/268; 23/269; 239/310

[56] References Cited

U.S. PATENT DOCUMENTS

| 1,679,561 | 8/1928 | Cantrell | 23/269 |
| 2,610,090 | 9/1952 | Johnson | 23/209 X |

FOREIGN PATENT DOCUMENTS 8912 of 1915 United Kingdom ...................... 23/269

Primary Examiner—Alan Cohan
Attorney, Agent, or Firm—Donald M. Sandler

[57] ABSTRACT

The invention relates to an apparatus for introducing water-soluble substances, especially plant treatment substances, such as fertilizers, plant protectives, weed killers and the like, into a water stream, the apparatus having a casing for carrying a water stream and a container for taking up said substances. The container is arranged within said casing for rotation around a rotational axis and has a completely closed peripheral wall, laterally limiting the interior of said container, and has a completely closed bottom wall section. At least one opening is provided at the upper side of said container, the edge of said opening being nearer to the rotational axis of the container than at least a part of the inner surface of the peripheral wall, said part being arranged in between the bottom wall section and the opening.

30 Claims, 7 Drawing Figures

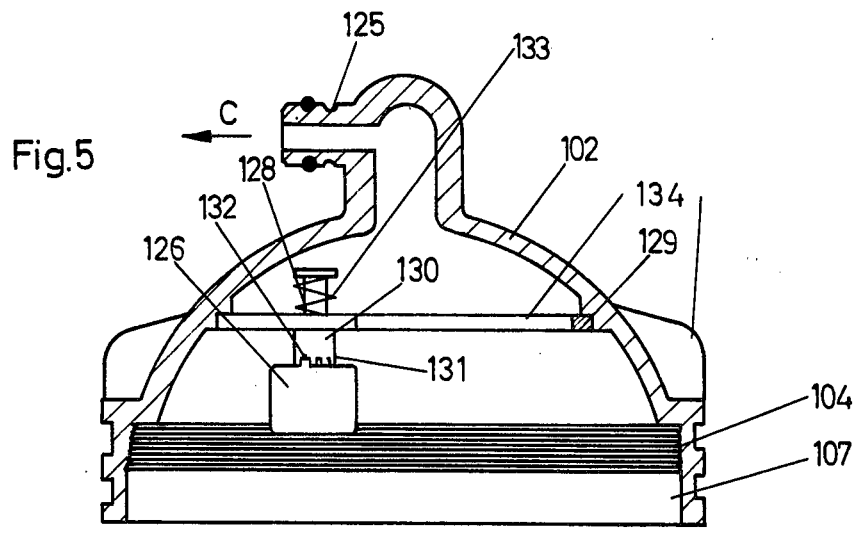
Fig.5
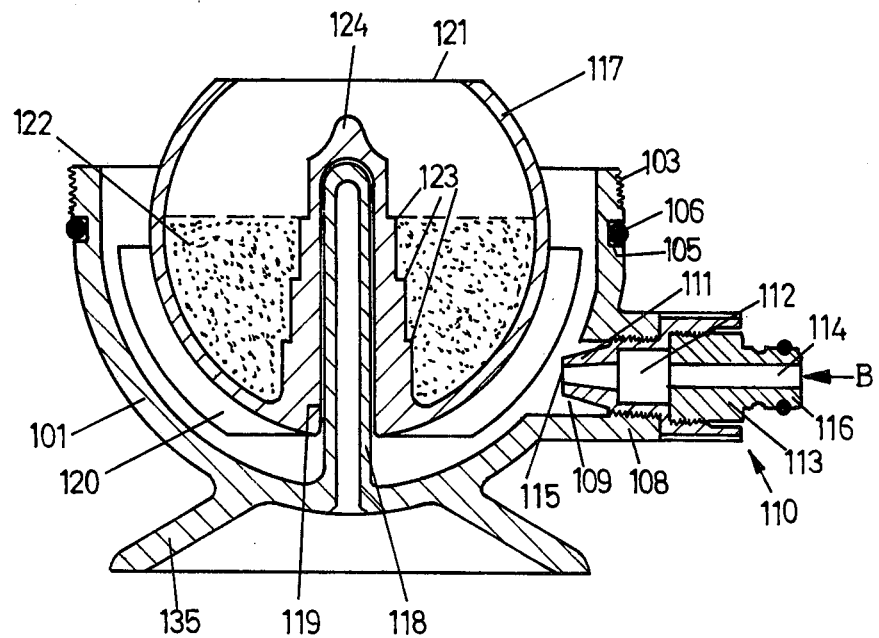

APPARATUS FOR INTRODUCING INGREDIENTS, ESPECIALLY PLANT TREATING SUBSTANCES, INTO A STREAM OF WATER

This application is a continuation-in-part of copending application Ser. No. 693,464, filed June 7, 1976, now abandoned.

BACKGROUND OF THE INVENTIONS

The invention refers to a new apparatus for introducing water-soluble substances, especially plant treatment substances, such as fertilizers, plant protectives, weed killers and the like, into a water stream. The apparatus has a casing for carrying a water stream, which casing is provided with an inlet and an outlet for the water, and has a container for taking up said substances, which container is arranged within said casing for rotation around a rotational axis and has at least one opening.

In the field of gardening and in agriculture the problem frequently arises as to how best to apply a fertilizer to the soil or distribute a plant protective or a weed killer on a gardening or field area both from the point of view of incurring a minimum of work and from the point of view of saving costs. Especially with fertilizers, up to now it has been usual to distribute the generally granular or powder-like material in dry condition manually or by automatic distributing machines. This method has various serious disadvantages. As a result of the highly concentrated fertilizer in undissolved form burning is easily caused especially with young plants, the more so because the distribution is generally rather irregular and in places accumulation of fertilizer cannot be avoided. Furthermore, the fertilizer is partly lost as a result of wind or for other reasons or alternatively is distributed to the wrong areas so that an unnecessarily high consumption of fertilizer is incurred. Furthermore, the fertilizing effect is delayed, because a dissolving of the fertilizer by rain or pouring water is required before the fertilizer can be absorbed by the plants.

In order to avoid these disadvantages devices had already been proposed, by which fertilizers and other materials for treating plants are introduced into the pouring water.

In a known apparatus of this kind (British Pat. No. 8,912) the blending of the water with water soluble substances is obtained by a cylindrically shaped body, which is made from the material to be added to the water and which is arranged within a cylindrically shaped casing, with the water flowing through said casing in axial direction and thereby dissolving said body or material respectively. However, this known apparatus has the disadvantage that uniform dissolving of the material contained in the casing and a uniform blending of the water with this material is not possible. Furthermore, it cannot be avoided that undissolved or not completely dissolved material is added to the water flow, so that for example nozzles of a sprinkler connected with the outlet of this known apparatus are clogged after a short time. If a screen is provided at the output of the known apparatus, a clogging of the nozzles of a sprinkler can only be avoided, if the openings of this screen have a very small diameter. However, such a screen has the disadvantage, that the screen itself will be clogged by undissolved material, so that after a short time of operation the known apparatus will fail to work properly and no material or only an insufficient amount of said material will be mixed in with the pouring water. This is the more true as fertilizers rather often include materials, which ar-e difficult to dissolve in water.

Furthermore, devices for introducing water-soluble substances into a water stream are known (U.S. Pat. Nos. 1,679,561 and 2,610,090) in which devices a container is rotatably arranged within a casing, through which water flows. The container for taking up the water-soluble substances is provided with a number of openings in the peripheral wall, that means in a wall section, which is arranged concentrically with the axis of rotation. The principle mode of operation of all known devices is that the water-soluble material is mixed with the water inside the rotating container and the water blended with this material leaves the container through the openings provided in the peripheral wall. Also these known devices having a rotating container do not avoid the problem that undissolved material leaves the container together with the water through the openings, if these openings have a relatively large diameter. If the openings are of smaller diameter, they will be clogged after a short time of operation, so that no material or only an insufficient amount of material is mixed in with the water.

OBJECT OF THE INVENTION

It is an object of the invention to provide a new apparatus for introducing water-soluble substances, especially plant treatment substances, such as fertilzers, plant protectives, weed killers and the like into a water stream, which apparatus avoids the disadvantages of the known devices. Furthermore it is an object of the present invention to provide an apparatus for introducing water-soluble substances, especially plant treatment substances, such as fertilizers, plant protectives, weed killers and the like, into a water stream, the apparatus having a casing for carrying a water stream, which casing is provided with an inlet and an outlet for the water, the apparatus having further a container for taking up said substances, which container is arranged within said casing for rotation around a rotational axis and has a completely closed peripheral wall laterally limiting the interior of the container, and having a completely closed bottom and at least one opening in the area of the upper container side remote from said bottom. The edge of said opening is nearer to the rotational axis of the container than at least one part or section of the inner surfaces of the peripheral wall, which part or section is arranged between said bottom and said opening.

The mode of operation of the inventive apparatus, which contrary to the known devices has no openings in the peripheral wall, is quite different from that (the mode of operation) of the known devices. In the inventive apparatus the undissolved material is pressed against the completely closed peripheral wall as a result of the centrifugal force, so that undissolved material or substances cannot leave the container through the opening, the edge of which is nearer to the rotational axis than at least a part of the inner surface of the peripheral wall, against which the undissolved material is pressed. Only completely dissolved material can leave the container through the container opening. The diameter of the opening can be much bigger than the maximum grain diameter of the water-soluble substances, so that clogging the opening is avoided in spite of a uniform blending of the water with dissolved material.

In a prefered embodiment of the invention the container is a hollow body presenting rotation symmetry, for example a spherically or cylindrically shaped body, and it will be sufficient, to provide only one opening at the upper side of this container. If only a single opening is provided, the edge of this opening is formed by the upper edge of the peripheral wall and the edge of the opening is arranged concentrically in view of the rotational axis of the container.

It is also possible to provide an additional stirring means member, which is supported on the casing and which reaches through the opening of the container into the interior of said container. The amount of material which is dissolved by the water in a certain time period, can be adjusted or changed by changing the position of said stirring means.

These and other features and advantages of my invention will be more fully apparent from the following description, made in connection with the accompanying drawings showing two different embodiments of the invention and in which:

FIG. 5 shows the cross section of FIG. 4, however with the cover of the casing removed from said casing;

Figure 1:
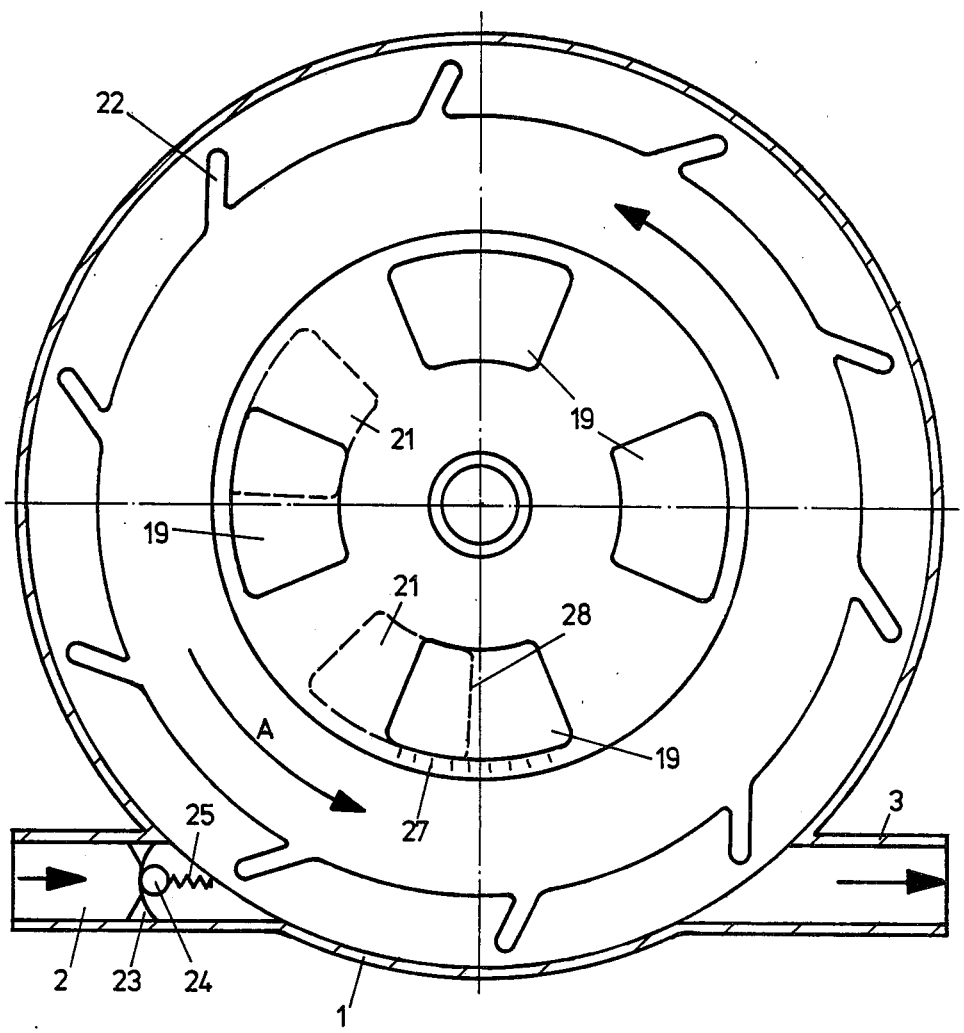
FIG. 1 shows a plan view, partly in section of a first embodiment according to the invention.
Figure 2:
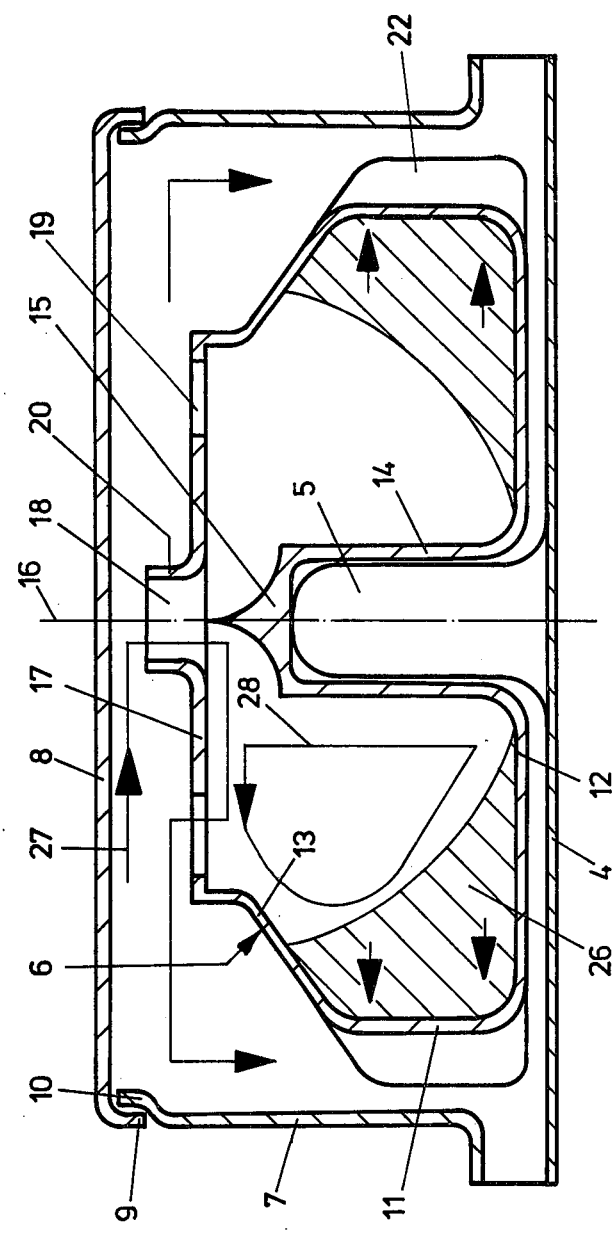
FIG. 2 shows a section through the first embodiment along line I—I of FIG. 1.
Figure 3:
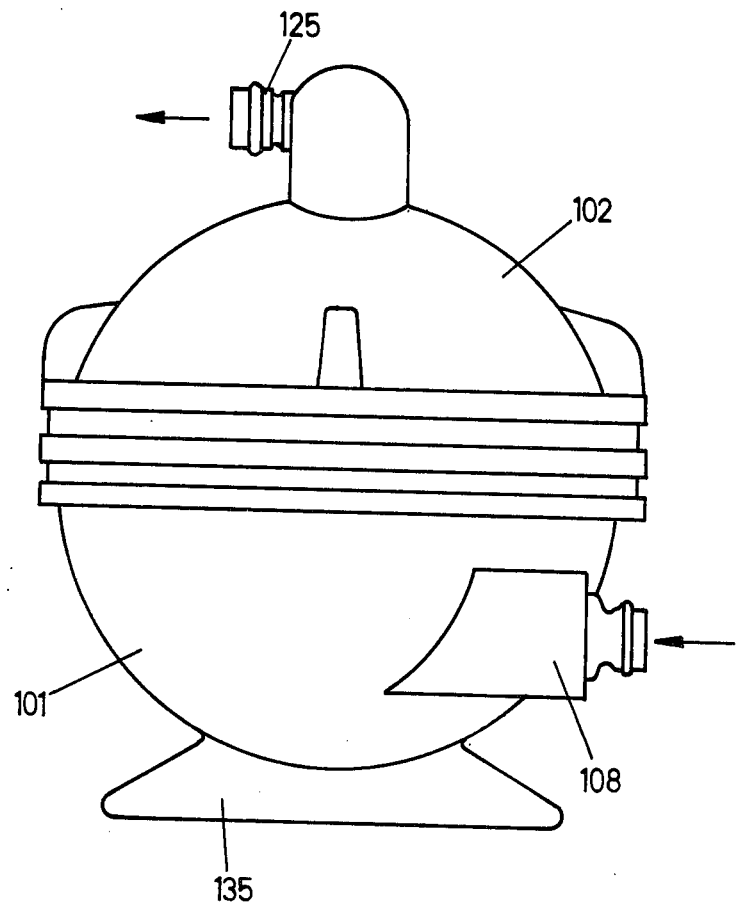
FIG. 3 shows a side view of the second embodiment according to the invention.
Figure 4:
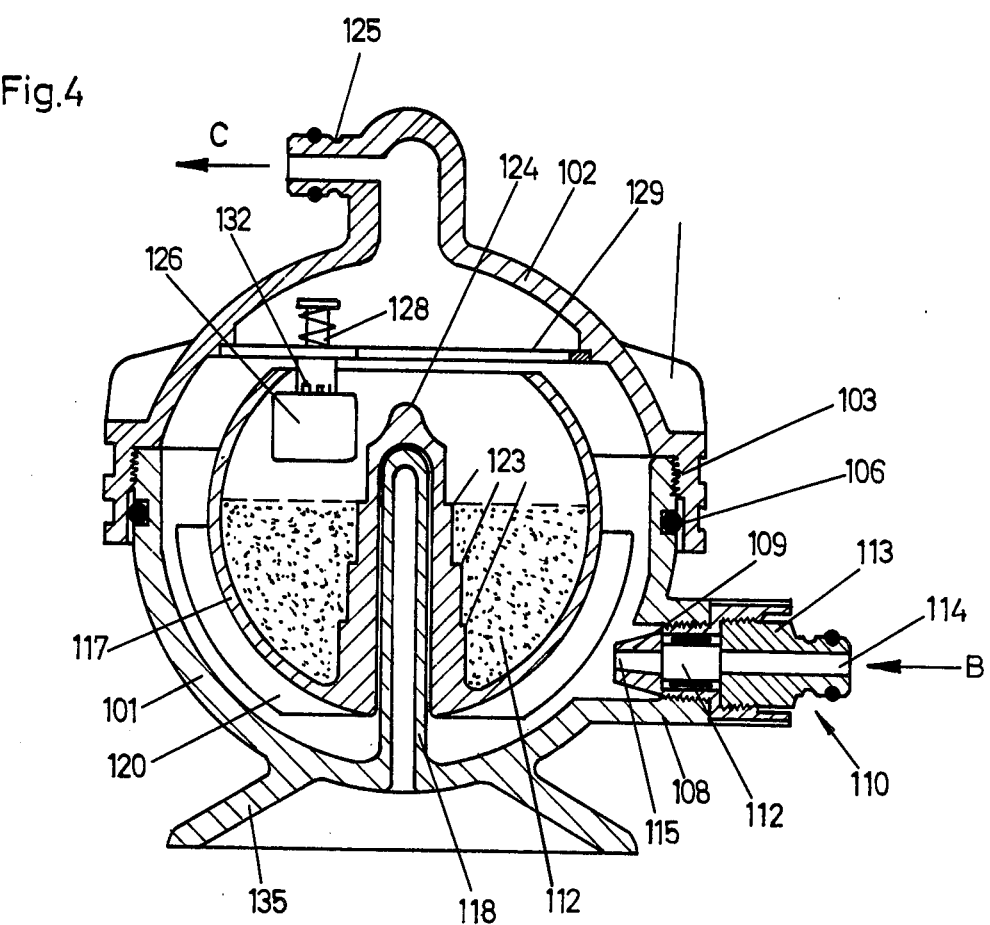
FIG. 4 shows a cross section through the embodiment of FIG. 3, with the water inlet pipe being laid in the plane of this figure for simplification purposes.
Figure 6:
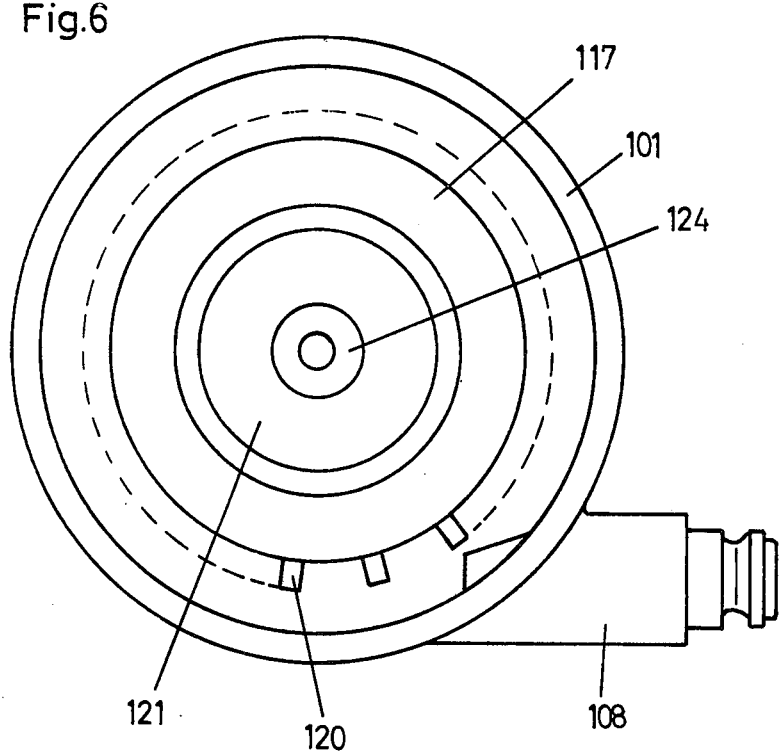
FIG. 6 is a plan view of the apparatus of FIG. 3 with the cover removed.

In the embodiment of the inventive apparatus shown in FIGS. 1 and 2, 1 is a casing in rounded cross section through which water flows, is provided with a short water inlet pipe 2 and a short water outlet pipe 3, which are appropriatdy connected, e.g. by using hoses with the water main or water tap or alternatively with a sprinkler or a garden sprayer. In the centre of the casing 1 or alternatively in the centre of the bottom 4 of the casing a pivot pin 5 is provided for supporting a container 6, which is rotable around said pivot pin (FIG. 3). All the parts of the casing are preferably made (water inlet and outlet pipe 2 and 3, pivot pin 5 and so on) as a unit from plastic material, whereby, for reasons of the simpler production of the casing or alternatively in order to be able more easily to remove the casing from the mould which is necessary for producing said casing, it is useful to produce at least part of the casing lateral wall 7 separately, and combine said part in a manner known per se by gluing, welding or the like with the remaining casing.

On its upper side the casing is provided with a cover 8 preferably made from transparent material, which cover is seated with its downwardly directed outer rim on the internally drawn upper rim 10 of the casing at the outer wall 7 and is mounted f.i. by clamp fitting for locking. By means of the upper inwardly drawn rim 10 the outer wall 7 also gets the required mechanical strength in order to withstand external forces.

The container 6 similar to the casing 1 is of rounded cross-section, and comprises an outer wall 11, which extends concentrically to the pivot pin 5, which outer wall on the one hand joins a bottom surface 12 and on the other hand joins a truncated surface 13. The bottom surface 12 is drawn inwardly for forming a bearing sleeve 14, which embraces the pivot pin 5, whereby said sleeve 14 extends into a tip 15 in order to gain better flow conditions at front surface thereof directed towards the interior of the container.

The end of the surface 13, which tapers towards the rotational axis 16 of the container forms an upper opening of the container, which can be closed by a cover 17 preferably made from transparent material. Container 6 and cover 17 again are preferably made from plastic material.

Cover 17 is provided with a centre opening 18 and additional openings 19, which are arranged around said centre opening, whereby it is possible to adapt the number of the additional openings 19 to the corresponding type of use or alternatively to make their number different from the embodiment shown within the drawings.

With the embodiment shown the openings 19 can be closed entirely or partly by providing in addition to cover 17 a disc on said cover, which disc is rotable around the centre extension 20 and contacts the cover 17; preferably said disc is also made from transparent material. Within said disc openings 21 are provided, which correspond to the openings 19; said openings 21 can be aligned entirely or partly or not at all by correspondingly rotating the disc around the centre extension 20 of the cover 17 with the openings 19 so that dependent on the position of the disc a resulting opening is obtained within the cover 17 the cross-section of which opening can be varied whereby the cross-section of said resulting openings is determined by the area across which the opening 19 and 21 overlap each other.

At the outer wall of the container 6 blades 22 are formed, which extend in an inclined direction in view of the container radius; said blades are hit by the water flowing through the short inlet pipe 2 and rotate the container 6 in the direction of arrow A of FIG. 1. By correspondingly choosing the angle of inclination of the blades 22 in view of the container radius the rotational speed of the container 6 can be adjusted to the required value. Within the short inlet pipe 2 a checkvalve is provided, which consists of the valve seat 23, the ball 24 and the spring 25, which latter urges the ball 24 towards the spring seat 23. A check-valve is preferred in order to prevent that dissolved material will pass from the apparatus according to this invention into the water pipe connected to the short inlet pipe 2, which especially is true if means are provided on the sprinkler connected to the short water outlet pipe 3 or at a corresponding sprayer, which allow interruption of the water stream.

In order to operate the shown apparatus initially cover 8 of the casing is opened and the container 6 is removed from the casing. Then, cover 17 of the container is opened and a certain amount of material to be added to the pouring water, f.i. fertilizer, plant protectives, weed killer or the like is filled in. Subsequent thereto countainer 6 is closed again by means of the cover 17 and the additional disc on cover 17 is adjusted in such a manner that the openings 19 or alternatively 21 form a resulting opening, which corresponds to the required concentration of the material 26 within the pouring water. In order to simplify the adjustment operation a scala 27 is provided at the opening 19, at which the position of an edge 28 of the corresponding opening 21 can be read. After having adjusted the resulting openings within the container cover 17, which openings are formed by the openings 19 and 21, the casing 1 is closed again by means of the cover 8 and the water supply is opened or alternatively the short inlet pipe 2 is connected to the water mains. By means of water flowing through the casing 1 through pipes 2 and 3 the container 6—as already described—is rotated in the direction of arrow A of FIG. 1 around the pivot pin 5, which causes the material 26 provided within the container 6 in view of the centrifugal or rotational force acting upon the substance 26 is urged towards the outside wall 11, the bottom surface 12 and the truncated surface 13 of the container in a manner shown in FIG. 2. The rotational movement of the container 6 generates a flow 27 by means of which water enters the interior of the container 6 through the centre opening 18 within the container cover 17 and discharges from the container through the opening 19. Simultaneously vortex flow 28 is formed within the interior of the container, which vortex flow dissolves the material 26 and mixes partly with the flow 27 in the interior of the container so that dissolved material 26 passes through the openings 19 into the water flow surrounding the container 6 and is discharged to the short outlet pipe 3. The amount of dissolved material 26, which is discharged from the container 6, of course is determined by the intensity of the flow 27 and thus by the dimensions of the openings 19 or alternatively of the resulting openings, which are formed by the openings 19 and 21.

Because—as can be seen from FIG. 2—the openings 19 or 21 and the centre opening 18 in the cover 17 of the container 6 have a sufficient distance from the substance 26, which is provided within the container 6 and is not yet dissolved, or alternatively from the corresponding container wall towards which the not yet dissolved material 26 is urged, and because furthermore further openings within the container 6 are not provided it is assured that only dissolved material will leave the container 6 together with the flow 27 so that clogging of the nozzles, f.i. of a sprinkler, with which the apparatus is connected, by means of not dissolved or incompletely dissolved material is effectively prevented. In the embodiment shown in FIGS. 3 to 7, the casing 101 through which water flows, has the shape of a hollow hemisphere being open at the upper side and being closed at the lower side. The casing 101 can be closed by a cover 102, which also has the shape of a hollow hemisphere, so that the combination of the casing and the cover is spherically shaped, when the cover is closed. The closing of the casing 101 is achieved by screwing on the cover 102. For this purpose, the upper part of the peripheral wall of the casing 101 is provided with an external thread 103 and an internal thread 104 is provided at the lower inner part of the peripheral wall of the cover 102 in the area of the cover opening. A sealing ring 106 made of elastic material, for example of rubber of elastic plastic material is positioned in an annular groove 105, which is formed in the peripheral wall of the casing 101 below the external thread 103. When the cover 102 is closed, this sealing ring 106 is pressed against the inner surfaces of a cylindrically shaped flange 107 being provided on the cover 102 and extending downwardly from said cover in order to provide a watertight connection between the casing 101 and the cover 102. The casing 101 has a short water inlet pipe 108 with an opening or bore hole 109, forming a water passage into the casing. A nozzle arrangement 110 is positioned and fixed in said water inlet pipe 108 by an external thread of the nozzle arrangement 110 engaging an internal thread of the short pipe 108. The nozzle arrangement 110 comprises a nozzle member 111 with a water passage 112 and a connecting member 113 with a water passage 114, which connecting member can be connected via a hose with a water supply. The nozzle end 115 of the nozzle member 111 extends into the interior of the casing 101. The connecting end 116 of the connecting member 113 projects from the short inlet pipe 108, so that this connecting end 116 can be connected with the one end of the hose (not shown), the other end of this hose being connected with the water supply, for example with a water main or water tap. The water flows in direction of the arrow B through the openings 114, 112 and through the nozzle end 115 into the casing 110.

A container 117 is positioned inside the casing 101, which container is spherically shaped and is supported for rotation around a vertical axis. The supporting of the container 117 is obtained by a pivot pin 118, which pivot pin is connected with the casing 101 at its one end and reaches into a bearing hole 119 of the container 117. A plurality of blades 120 is provided on the outer surfaces of the container 117 in the area of the lower part of this container. The surfaces of these blades 120 projecting from the outer surface of the container are parallel to the axis of rotation or are inclined in view of this axis.

A circular opening 121 is provided at the upper side of the container 117, the diameter of this opening being smaller than the maximum internal diameter of the container 117.

When the apparatus shown in FIGS. 3 to 7 is in use, first of all the cover 102 of the casing 101 is removed and a certain amount of material 122 to be added to the water, e.g. fertilizer, is filled into the container 117 through the opening 121. The amount of material filled into the container 117 is such that the upper part of the container inside is not occupied by the material 122. The maximum filling height is indicated by the ring-like ledge 123 provided on the outer surface of the sleeve-like member 124 forming the bearing or supporting hole 119. Subsequently the casing is closed by the cover 102 and the water supply is turned on or alternatively the short inlet pipe 108 is connected to the water mains, so that water flows into the interior of the casing 101 in direction of the arrow B through the nozzle arrangement 110. The container 117 is driven by the water emerging from the nozzle end 115 and being directed onto the blades 120. The material 122 inside the container 117 is pressed against the inner surface of the peripheral wall as a result of the centrifugal or rotational force, which peripheral wall is completely closed and is only provided with the opening 121 at the upper side of the container 117. As has been already described in connection with FIGS. 1 and 2, only material 122 being completely dissolved in the water can leave the interior of the container 117 with the water because of the centrifugal force pressing the undissolved material against the inner surface of the container's peripheral wall. The water enters the container 117 through the opening 121 and leaves the container 117 again through this opening. At the center of the cover 102 there is provided a short water outlet pipe 125, which can be connected for example via a hose with a sprinkler or the like and through which the water and the dissolved material leaves the casing 101 as indicated by Arrow C. In order to obtain an effective rotational motion of the container 117 by the water emerging from the nozzle end 115, the nozzle arrangement 110 is so positioned that the water beam emerging from the nozzle end 115 is nearly tangentially directed on the blades 120 provided on the lower part of the casing 117. For this reason the water inlet pipe 108 is laterally offset in view of the sectional plane of FIGS. 4 and 5, as is shown in FIG. 3. Only for simplification purposes is the water inlet pipe 108 shown in FIGS. 4 and 5 as lying in the section plane of these figures.

Figure 7:
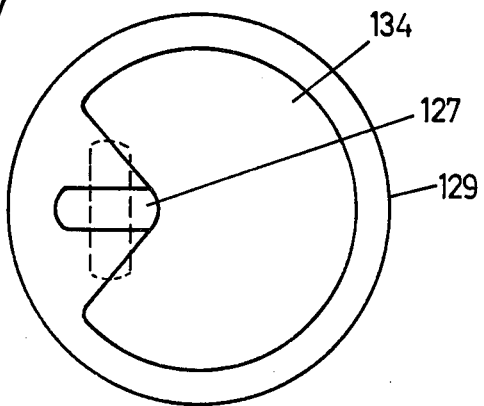
FIG. 7 shows a supporting plate or member provided with a stirring means for use in the apparatus or embodiment shown in the FIGS. 3 to 6.

The amount of material 122 which is dissolved by the water in a certain time period, depends on the construction of the apparatus and on the water pressure or on the velocity of flow of the water entering the casing through the nozzle arrangement 110 or leaving the casing through the water outlet pipe 125 respectively. In order to obtain the possibility of adjusting the amount of material 122 to be dissolved in the water within a certain time period independently of the water pressure and velocity of flow of water, a stirring member 126 is provided on the cover 102, which stirring member has a flat or plate-like section 127. When the cover 102 is closed, this section 127 reaches into the part of the interior of the container 117, which part is not occupied by the material 122. The section 127 has a pin-like projection projecting from the upper edge of the section 127. The stirring member 126 is supported on a plate 129 by this projection 128 and can be pivoted around a vertical axis in relation to the plate 129, so that the section 127 can have different positions in relation to this plate. FIG. 7 shows two different positions for the section 127. In the first position shown by solid lines in FIG. 7, the larger surfaces of the section 127 are nearly radial in view of the axis of rotation of the container 117. In the second position shown by dotted lines in FIG. 7, the larger surfaces of the section 127 are nearly tangential in view of the direction of rotation of the container 117. When the section 127 is in the first position shown by solid lines in FIG. 7, the stirring member 126 provides an additional strong vortex inside the rotating container 117, so that a quicker dissolving of the material 122 in the water is obtained. When the section 127 of this stirring member 126 is in the second position shown in FIG. 7 by dotted lines, the stirring member 126 provides only a small amount of additiona-1 vortex in the rotating container 117, so that a longer time period is necessary for completely dissolving the material 122 in the container 117. The stirring member 126 is fixed or locked in its adjusted position by a cam 132 on the upper edge of the section 127 engaging a notch 131, which is provided on a front end surface of a sleeve 130. The sleeve 130, which is the supporting member for the projection 128, projects from the lower surface of the plate 129. Preferably, there is provided a plurality of notches 131, so that the stirring member 126 or the section 127 respectively can be locked in different positions. A compression spring 133 resting with its one end against the upper surface of the plate 129 and with its other end against a thick end-portion of the projection 128 forces the cam 132 into enga-gement with a notch 131. In order to provide a water passage through the plate 129, an opening 134 is provided in this plate, which opening can be closed by a screen (not shown), in order to prevent undissolved material from leaving the apparatus, even in the case of operation failures or defects. However, such a screen is not necessary for the normal mode of operation.

Preferably, the cover 102 and the water outlet pipe 125, the container 117 and the casing 101 including the bearing pin and the foot or base member 135 for positioning the casing 101 on a surface are made of plastic material.

The inventive apparatus is preferably supplied with a number of interchangable containers 6 or 117 so that it is possible for the user to use the same apparatus for mixing various materials with the pouring water, whereby the containers including the various materials can then simply be interchanged. In view of the fact that the covers 8, 17 or 120 respectively and the blade 129 are made of transparent material, it is easy to control the consumption of the material 26 or 122.

We claim:

1. An apparatus for introducing water-soluble substances, especially plant treatment substances, such as fertilizers, plant protectives, weed killers and the like into a water stream, the apparatus comprising in combination;

a casing for carrying a water stream, the casing having an inlet and an outlet for the water;

a container for taking up said substances, said container being arranged within said casing for rotation around a rotational axis and having a completely closed peripheral wall section, said wall section laterally limiting the interior of said container, and having a completely closed bottom wall section and an opening provided at the container's upper side remote from said bottom section, the edge of said opening being nearer to the rotational axis of the container than a part of the inner surfaces of the peripheral wall, which part is provided in between said bottom wall section and said opening.

2. Apparatus as claimed in claim 1, characterized in that the edge of said opening is formed by the upper edge of the peripheral wall.

3. Apparatus as claimed in claim 2, characterized in that the axis of said opening is parallel to the axis of rotation of the container.

4. Apparatus as claimed in claim 2, that the upper edge of the peripheral wall forming the edge of said opening is concentrically arranged with the axis of rotation.

5. Apparatus as claimed in claim 2, characterized in that the container is a hollow body presenting rotation symmetry, for example a hollow spherically shaped body, and that the axis of rotation is the axis of symmetry of said body.

6. Apparatus as claimed in claim 5, wherein a stirring member is supported in the casing and reaches through said opening into the interior of said container, said stirring member having a surface, the position of which surface in relation to the peripheral wall or to motion of rotation of the container can be adjusted.

7. Apparatus as claimed in claim 5, characterized in that the container has an upper wall section, and that said opening is provided within an area of said upper wall section between said rotational axis and said peripheral wall section and being distant from said peripheral area.

8. An apparatus as claimed in claim 7, wherein the bottom wall section extends transversely to said peripheral wall section, and the upper wall section extends transversely to said peripheral wall section.

9. An apparatus as claimed in claim 7, wherein a truncated wall section is arranged between said peripheral wall section and said upper wall section.

10. An apparatus as claimed in claim 7, wherein said upper wall section is at least partly formed by a removable cover.

11. An apparatus as claimed in claim 7, wherein a central opening and at least one further opening are provided in said upper wall section, said further opening being staggered radially in view of said central opening.

12. An apparatus as claimed in claim 11, further comprising means for entirely or partly closing said further opening.

13. An apparatus as claimed in claim 12, wherein a scale is provided at said further opening.

14. An apparatus as claimed in claim 12, wherein the means for partly or entirely closing said further opening are formed by at least one disc, which is movable or rotatable relative to said upper wall section, said disc and said upper wall section being provided with openings, which openings entirely or partly can be aligned by mutual rotation of the discs.

15. Apparatus as claimed in claim 1, wherein the casing includes an opening which can be closed by a removable cover and wherein the cross-section of said opening is chosen in such a way that the container can be removed from the casing.

16. An apparatus as claimed in claim 1, wherein the container is simultaneously part of a water driven turbine.

17. An apparatus as claimed in claim 16, wherein the container is provided on its outer periphery with blades, which preferably are inclined in view of the container radius.

18. An apparatus as claimed in claim 16, wherein the bottom wall section extends transversely to said peripheral wall section, and the upper wall section extends transversely to said peripheral wall section.

19. An apparatus as claimed in claim 16, wherein a truncated wall section is arranged between said peripheral wall section and said upper wall section.

20. An apparatus as claimed in claim 16, wherein said upper wall section is at least partly formed by a removeable cover.

21. An apparatus as claimed in claim 16, wherein a central opening and at least one further opening are provided in said upper wall section, which further opening is staggered radially in view of said central opening.

22. An apparatus as claimed in claim 21, further comprising means for entirely or partly closing said further opening.

23. An apparatus as claimed in claim 22, wherein a scale is provided at said further opening.

24. An apparatus as claimed in claim 22, wherein the means for partly or entirely closing said further opening are formed by at least one disc, which is movable or rotatable relative to said upper wall section said disc and said upper wall section being provided with openings, which openings entirely or partly can be aligned by mutual rotation of the discs.

25. An apparatus as claimed in claim 16, wherein the casing is provided with a water inlet conduit and a water outlet conduit and a check valve is provided within said water inlet conduit.

26. An apparatus as claimed in claim 16, characterized in that the edge of said opening is formed by the upper edge of the peripheral wall.

27. Apparatus as claimed in claim 16, characterized in that the axis of said opening is parallel to the axis of rotation of the container.

28. Apparatus as claimed in claim 16, that the upper edge of the peripheral wall forming the edge of said opening is concentrically arranged with the axis of rotation.

29. Apparatus as claimed in claim 16, characterized in that the container is a hollow body presenting rotation symmetry, for example a hollow spherically shaped body, and that the axis of rotation is the axis of symmetry of said body.

30. Apparatus as claimed in claim 29, wherein a stirring member is supported in the casing and reaches through said opening into the interior of said container, said stirring member having a surface, the position of which surface in relation to the peripheral wall or to the motion of rotation of the container can be adjusted.

* * * * *